US008339268B2

(12) United States Patent
Deng et al.

(10) Patent No.: US 8,339,268 B2
(45) Date of Patent: Dec. 25, 2012

(54) DRIVER CONFIGURABLE DROWSINESS PREVENTION

(75) Inventors: Bing Deng, Shanghai (CN); Jenne-Tai Wang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 600 days.

(21) Appl. No.: 12/615,316

(22) Filed: Nov. 10, 2009

(65) Prior Publication Data

US 2011/0109462 A1 May 12, 2011

(51) Int. Cl.

*G08B 23/00* (2006.01)
*H04M 3/00* (2006.01)
*H04M 1/66* (2006.01)
*G06K 9/00* (2006.01)

(52) U.S. Cl. ........ 340/575; 340/576; 455/418; 455/411; 382/103

(58) Field of Classification Search .................. 340/575, 340/576
See application file for complete search history.

(56) References Cited

U.S. PATENT DOCUMENTS 5,508,685 A * 4/1996 Monte, Jr. ..................... 340/576
5,714,925 A 2/1998 Lee et al.
6,380,859 B1 4/2002 Brownlee
6,392,550 B1 * 5/2002 Najor ............................ 340/576
6,686,845 B2 2/2004 Oyama
7,138,922 B2 11/2006 Strumolo et al.
2003/0096593 A1 * 5/2003 Naboulsi ....................... 455/411
2004/0183685 A1 * 9/2004 Strumolo et al. ............. 340/575
2005/0030184 A1 2/2005 Victor
2005/0212667 A1 9/2005 Lengning et al.
2007/0024454 A1 * 2/2007 Singhal ......................... 340/576
2008/0180257 A1 7/2008 Omi et al.
2009/0121882 A1 * 5/2009 Al-Mutairi .................... 340/575
2009/0299567 A1 * 12/2009 Larschan et al. ................ 701/33
2010/0102972 A1 * 4/2010 Middlekauff et al. ........ 340/576
2010/0202658 A1 * 8/2010 Ishida et al. .................. 382/103
2011/0105097 A1 * 5/2011 Tadayon et al. ............... 455/418
2011/0234413 A1 * 9/2011 Dobbs ........................... 340/575

* cited by examiner

*Primary Examiner* — George Bugg
*Assistant Examiner* — Jack K Wang

(57) ABSTRACT

A driver drowsiness mitigation system of a vehicle includes a driver impairment detection system for detecting drowsiness of a driver of the vehicle. A plurality of alert devices is provided for countering a drowsiness of the driver of the vehicle. A controller enables at least one of the alert devices when a drowsiness of the driver is detected. A prioritized order for enabling respective alert devices is selectively configurable within the controller according to the identity of the driver.

20 Claims, 2 Drawing Sheets

DRIVER CONFIGURABLE DROWSINESS PREVENTION

BACKGROUND OF INVENTION

An embodiment relates generally to a driver drowsiness mitigation system.

Driver fatigue is a condition which occurs when a person operating a vehicle exhibits symptoms of fatigue typically induced from monotonous driving conditions. Such conditions can occur anytime due to lack of rest, but typically occur during the nighttime hours to early morning hours when driving on roads such as freeways where traffic conditions are light or have no traffic. Driver fatigue may further occur when the driver is exhausted and has been without rest for a long period of time.

Driver fatigue may result in a driver of a vehicle falling asleep and losing control of the vehicle. Driver fatigue also results in delayed response times by the driver either failing to quickly react or not readily becoming aware of a condition in the road.

Methods are known to identify a drowsy driver. An alert may be generated, but there may be differences in individual reactions to various stimuli that have been used to counteract drowsiness. A stimulus that has little effect on one driver may over-startle another driver. Since individuals react to different stimuli, there needs to be a better method and system for alerting the individual driver.

SUMMARY OF INVENTION

An advantage of an embodiment is a personal configuration of drowsiness mitigation devices that are deployable in a prioritized order based on an identity of the driver.

An embodiment contemplates a driver drowsiness mitigation system of a vehicle including a driver impairment detection system for detecting drowsiness of a driver of the vehicle. A plurality of alert devices is provided for countering a drowsiness of the driver of the vehicle. A controller enables at least one of the alert devices when a drowsiness of the driver is detected. A prioritized order for enabling respective alert devices is selectively configurable within the controller according to the identity of the driver.

An embodiment contemplates a method for countering drowsiness of a driver of a vehicle when driver drowsiness is detected. The method includes detecting a drowsiness of the driver of the vehicle during an operation of the vehicle. The driver of the vehicle is identified. Respective drowsiness mitigation devices associated with the identified driver of the vehicle are identified. The respective drowsiness mitigation devices are configured for actuation in a prioritized order to counter the drowsiness of the driver. At least one of the drowsiness mitigation devices is selectively actuated in the respective prioritized order for countering the drowsiness of the driver in response to detecting drowsiness of the driver.

An embodiment contemplates a method for countering drowsiness of a driver of a vehicle. The method includes detecting a drowsiness of the driver of the vehicle during an operation of the vehicle. The driver of the vehicle is identified. Respective drowsiness mitigation devices associated with the identified driver of the vehicle are identified. The respective drowsiness mitigation devices are configured for actuation in a prioritized order to counter the drowsiness of the driver. A first drowsiness mitigation device is selectively actuated in the respective prioritized order for countering the drowsiness of the driver in response to detecting drowsiness of the driver. Drowsiness of the driver of the vehicle is detected after a predetermined time of the actuation of the first drowsiness mitigation device. A next drowsiness mitigation device is actuated in the respective prioritized order for countering the drowsiness of the driver in response to detecting drowsiness of the driver after the predetermined time. Otherwise, the first drowsiness mitigation device is de-actuated.

DETAILED DESCRIPTION

Figure 1:
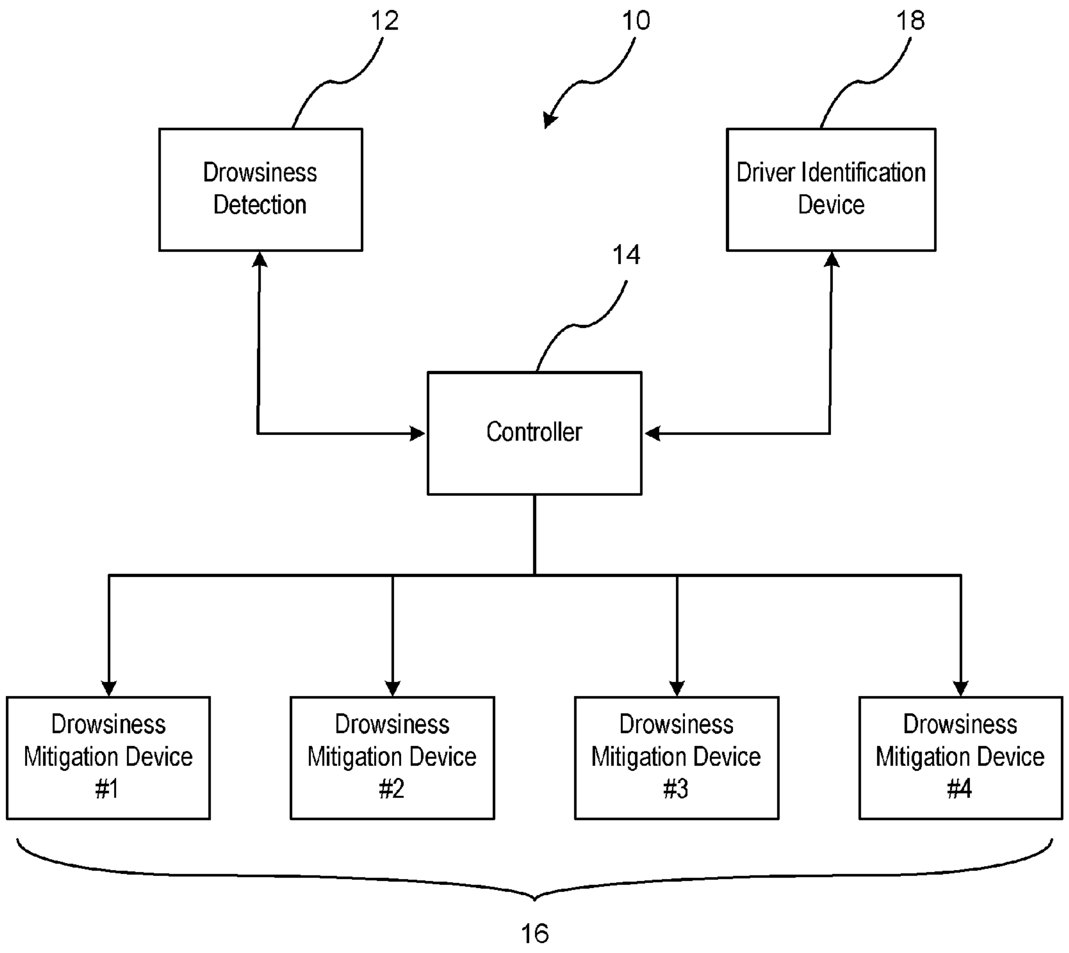
FIG. 1 is a block diagram of the driver drowsiness mitigation system according to an embodiment of the invention.

There is shown in FIG. 1, generally at 10, a drowsiness mitigation system of a vehicle that includes a driver impairment detection system 12, (e.g., a drowsiness detection system) for detecting a drowsiness of the driver of the vehicle. The driver impairment detection system 12 may include, but is not limited to, devices or methods for detecting a drowsy driver such as a camera-based system that detects drowsiness based on eye movement, head movement, or body movement. The driver impairment system 12 may also determine driver drowsiness through a selection switch actuated by the driver or unwanted vehicle movement such as lane veering.

The driver impairment detection system 12 is coupled to a controller 14 for providing notification to the controller 14. The controller 14 controls actuation of a plurality of alert devices 16, also referred to as drowsiness mitigation devices within the vehicle. It should be understood that the controller may be a standalone controller that is solely dedicated to the operation of the drowsiness mitigation system 10 or may be a controller 14 from another system or subsystem where shared use is performed by the impairment detection system or another system, subsystem or device.

The controller 14 is further in communication with a driver identification device 18. The plurality of alert devices 16 may include devices specifically dedicated to arousing the driver of the vehicle or devices within the vehicle that are currently used for typical vehicle operations but may be additionally used to mitigate driver drowsiness. The plurality of alert devices 16 may include, but is not limited to, the radio/entertainment system, air circulation devices, cold water mist spray devices, scent spray devices, temperature control devices, auto-window operation, mechanical apparatus for physical stimulus, electrical apparatus for physical stimulus, navigation devices for directions to resting/food/beverage locations, or enriching oxygen content devices. Various alert devices 16 as opposed to a single alert device are used since not every driver is stimulated in the same manner by a same respective alert device. Therefore, not only are a plurality of alert devices 16 provided, but the various alert devices may be configured for actuation in a respective order that is prioritized specifically to a driver based on the effectiveness of each device arousing the driver. As a result, having a plurality of alert devices and actuating respective devices in an order that is specific to a driver based on the effectiveness of mitigating drowsiness for the specific driver increases the likelihood that at least one of the alert devices of the vehicle will mitigate a drowsiness of each driver operating the vehicle.

Some of the alert devices used to mitigate drowsiness will be described as follows. The radio/entertainment system may be automatically actuated to a respective station or play specific music from a CD, which may include volume control of the audible outputs of the radio/entertainment device. Air circulation may be actuated and carried out by the vehicle heating, ventilation, and air conditioning (HVAC) system so that stagnant air is purged from the vehicle which may be a cause of driver drowsiness. In addition to the air circulation, temperature control may be regulated to provide cooler temperatures for arousing and/or maintaining the driver in an awakened state. Oxygen enrichment may be increased by a small percentage as oxygen deprivation contributes to a driver's drowsiness. Auto window operation may be actuated for opening one or more windows to an open position to generate forced air flow into the passenger compartment at the driver. Cold water spray or scent spray devices may be utilized for misting the interior of the vehicle, and in the case of cold water spray, on the driver for arousing the driver. Electrical/mechanical apparatus may be provided for physical stimulus that adjusts the driver seat to an uncomfortable seating posture as opposed to a relaxed position which would mitigate the driver from falling asleep. Other types of electrical/mechanical apparatus for physical stimuli could include vibration or small electric shocks (e.g., haptic) deployed from the seat or attaching components thereon. It is understood that the alert devices described above are only some of the devices that could be implemented for mitigating driver drowsiness and that other types of alert devices may be used without departing from the scope of the invention. It should be understood that the intent is to arouse the driver from the drowsiness state as opposed to startling a driver from a drowsy state.

The driver identification device 18 is used to identify or distinguish between the drivers. Identifying or distinguishing between the drivers allows the controller 14 to associate a respective prioritized list of alert safety devices with the driver currently operating the vehicle. Identification of the driver can be performed by the driver manually identifying oneself or inherently without any direct action by the driver. For example, a camera-based system can be used to identify the driver of the vehicle through facial recognition, particularly if the driver impairment system 12 is already utilizing a camera-based system; an RKE system or a passive entry system may be used to identify the driver where the user's fob is coded to provide an identification code to the controller 12 for identifying the driver; a cell phone or other portable communication device, such as a device using Bluetooth, may be used to autonomously communicate the identify of the driver to the controller 12; a safety and security assistance service, such as On-Star®, may be used to prompt the driver to identify oneself for which the driver verbally responds; or the driver may manually identify oneself by a selection device on the vehicle console or other device within the vehicle.

Each driver of the vehicle has an associated list of alert devices that are configured in a respective prioritized order that is specific to each driver. The prioritized order may be configured by the driver of the vehicle manually selecting the respective alert devices in the order the driver prefers the alert devices to be actuated should the driver become drowsy. Alternatively, the prioritized order may be selected based on testing the driver and determining how the driver responds to each alert device. That is, a test may be set up (e.g., at the dealership) where the various alert devices are actuated and a determination is made for prioritizing each of the alert devices by the effectiveness of arousing the driver from a drowsiness state. The greater the effectiveness of arousing the driver, the higher priority the alert device is on the list.

The controller 14, upon receiving a notification signal from the driver impairment device 12 indicating that the driver drowsiness is detected, sequentially actuates a first alert device in the prioritized order for arousing the driver. If the respective alert device is not effective for arousing the driver after a predetermined period of time, the controller will de-actuate the current alert device and actuate a next alert device on the prioritized list. Alternatively, previous alert devices if not effective may remain actuated while the current and successive alert devices are actuated.

Figure 2:
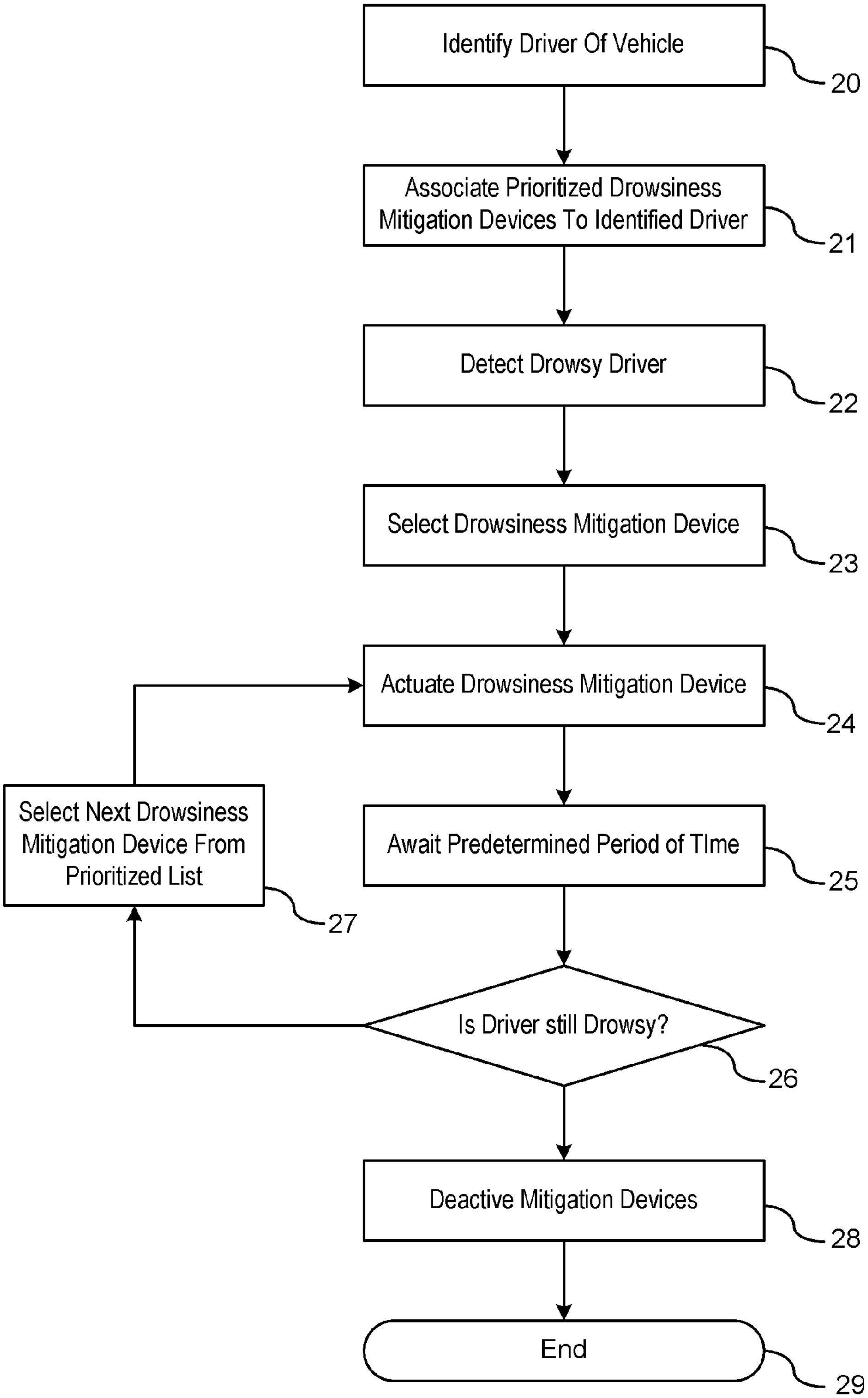
FIG. 2 is a flowchart of a method for mitigating driver drowsiness using the driver drowsiness mitigation system according to the embodiment of the invention.

FIG. 2 illustrates a flowchart for a method for mitigating the drowsiness of a driver. In step 20, the driver of a vehicle is identified as the driver approaches or the driver enters the vehicle. The identity of the driver, as used herein, is any identifier that enables the controller to associate the current operator of the vehicle with a stored prioritized ordered list for actuating respective alert devices for the specific driver.

In step 21, a listing of the alert devices to be actuated and the order in which the respective alert devices are actuated is associated with the identified driver.

In step 22, a drowsy driver is detected by the vehicle driver impairment device. Alternatively, the driver upon feeling drowsy may manually initiate the driver drowsiness mitigation system by actuating a dedicated actuation button on the steering wheel or within the interior of the vehicle.

In step 23, notification is provided to the controller as to the detected driver drowsiness. It should be understood that the controller may be a standalone controller or may be a controller that is already used by a system (e.g., driver impairment device).

In step 24, the first alert device in the prioritized of alert devices for actuation is actuated for arousing the driver of the vehicle from the drowsiness state. The first alert device is determined to be the most effective for arousing the driver from the drowsiness state. As stated earlier, the listing may be prioritized by the driver configuring the order or may be determined by evaluating the driver as to the effectiveness by each of the alert devices.

In step 25, a predetermined period of time elapses after the actuation of the alert device for determining its effectiveness.

In step 26, a determination is made whether the driver is still drowsy. This can be determined by either the camera-based system or by determining if any corrective maneuvers to the vehicle are being made (e.g., if veering had been detected and it is being corrected). If drowsiness is not detected, the routine proceeds to step 28 where any active drowsiness mitigation devices are deactivated and the routine ends in step 29. If the drowsiness of the driver is still detected, then the routine proceeds to step 27.

In step 27, a next alert device from the prioritized listing is selected. The next alert device is the next successive alert device from the prioritized list. The routine returns to step 24 where the selected alert device is actuated. It should be understood that the previous alert device may be de-actuated when the next alert device is actuated, or the previous alert device may continue in its actuation state while the next successive alert device is actuated. The routine will repeat steps 24 through 27 until the determination is made in step 26 that the driver drowsiness is no longer detected at which point the any active mitigation devices may be deactivated in step 28 and the routine terminates in step 29. It should be understood that one or more drowsiness mitigation devices may remain active for maintaining the driver in a non-drowsy state and that deactivation of the one or more drowsiness mitigation devices may require a manual deactivation by the driver.

While certain embodiments of the present invention have been described in detail, those familiar with the art to which this invention relates will recognize various alternative designs and embodiments for practicing the invention as defined by the following claims.

What is claimed is:

1. A driver drowsiness mitigation system of a vehicle comprising:

a driver impairment detection system for detecting drowsiness of a driver of the vehicle;

a plurality of alert devices for countering a drowsiness of the driver of the vehicle; and a controller for selectively enabling the plurality of alert devices when a drowsiness of the driver is detected according to a prioritized order, wherein the prioritized order for enabling respective alert devices is selectively configurable within the controller according to the identity of the driver.

2. The driver drowsiness mitigation system of claim 1 wherein the at least one alert device includes a cold water mist spray device.

3. The driver drowsiness mitigation system of claim 1 wherein the at least one alert device includes a scent spray device.

4. The driver drowsiness mitigation system of claim 1 wherein the at least one alert device includes a mechanical apparatus for physical discomfort.

5. The driver drowsiness mitigation system of claim 1 wherein the at least one alert device includes an electrical apparatus for physical discomfort.

6. The driver drowsiness mitigation system of claim 1 wherein the at least one alert device includes an air circulation device.

7. The driver drowsiness mitigation system of claim 6 wherein the air circulation device is temperature controlled.

8. The driver drowsiness mitigation system of claim 1 wherein the at least one alert device is a navigation-based device providing directions to a respective resting location.

9. The driver drowsiness mitigation system of claim 1 wherein the at least one alert device includes an audible alert device.

10. The driver drowsiness mitigation system of claim 1 wherein the at least one alert device includes a haptic alert device.

11. A method for countering drowsiness of a driver of a vehicle, the method comprising the steps of:

detecting a drowsiness of the driver of the vehicle during an operation of the vehicle;

identifying the driver of the vehicle; identifying respective drowsiness mitigation devices associated with the identified driver of the vehicle, the respective drowsiness mitigation devices being configured for actuation in a prioritized order to counter the drowsiness of the driver; and selectively actuating at least one of the respective drowsiness mitigation devices in the respective prioritized order for countering the drowsiness of the driver in response to detecting drowsiness of the driver.

12. The method of claim 11 wherein the configuration of the respective drowsiness mitigation devices are prioritized as selected by the driver of the vehicle.

13. The method of claim 11 wherein the configuration of the respective drowsiness mitigation devices are prioritized by an effectiveness of arousing the driver from the drowsiness.

14. The method of claim 11 wherein the driver is identified by the driver manually making a selective identification.

15. The method of claim 11 wherein the driver is identified by an automated driver identification system.

16. The method of claim 11 wherein the driver of the vehicle is identified in response to an action taken by the driver.

17. The method of claim 11 wherein a respective drowsiness mitigation device applies a visual response for countering the drowsiness of the driver.

18. The method of claim 11 wherein a respective drowsiness mitigation device applies an audible response for countering the drowsiness of the driver.

19. The method of claim 11 wherein a respective drowsiness mitigation device applies a haptic response for countering the drowsiness of the driver.

20. A method for countering drowsiness of a driver of a vehicle, the method comprising the steps of:

detecting a drowsiness of the driver of the vehicle during an operation of the vehicle;

identifying the driver of the vehicle;

identifying respective drowsiness mitigation devices associated with the identified driver of the vehicle, the respective drowsiness mitigation devices being configured for actuation in a prioritized order to counter the drowsiness of the driver;

selectively actuating a first drowsiness mitigation device from a plurality of drowsiness mitigation devices in the respective prioritized order for countering the drowsiness of the driver in response to detecting drowsiness of the driver;

detecting drowsiness of the driver of the vehicle after a predetermined time of the actuation of the first drowsiness mitigation device;

actuating a next drowsiness mitigation device in the respective prioritized order for countering the drowsiness of the driver in response to detecting drowsiness of the driver after the predetermined time, otherwise, de-actuating the first drowsiness mitigation device; and selectively actuating each of the plurality of drowsiness mitigation devices in the respective prioritized order for countering the drowsiness of the driver in response to detecting drowsiness of the driver after the predetermined time has elapsed from the actuation of a previous actuated drowsiness mitigation device, otherwise, de-actuating the previous drowsiness mitigation device.

* * * * *